US006771355B2

(12) United States Patent
Ishii et al.

(10) Patent No.: US 6,771,355 B2
(45) Date of Patent: Aug. 3, 2004

(54) PRODUCING HISTORY MANAGING METHOD AND SYSTEM FOR PHOTOSENSITIVE SHEET PACKAGE

(75) Inventors: Yoshiyuki Ishii, Shizuoka (JP); Hiroyuki Nishida, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 9 days.

(21) Appl. No.: 10/325,901

(22) Filed: Dec. 23, 2002

(65) Prior Publication Data

US 2003/0124471 A1 Jul. 3, 2003

(30) Foreign Application Priority Data

Dec. 21, 2001 (JP) ....................................... 2001-389376

(51) Int. Cl.[7] ........................ G03B 27/72; G03B 27/52; G03B 17/26; G03B 42/04; B65D 85/48

(52) U.S. Cl. ........................... 355/72; 355/40; 206/455; 378/182; 396/517

(58) Field of Search .............................. 355/18, 40, 72; 396/512, 517; 378/182, 183, 184, 185, 186, 187, 188; 206/455; 430/966; 347/262, 264

(56) References Cited

U.S. PATENT DOCUMENTS

| | | | | | |
|---|---|---|---|---|---|
| 5,260,741 | A | * | 11/1993 | Suzuki | 355/72 |
| 5,407,790 | A | * | 4/1995 | Dickerson et al. | 430/509 |
| 5,546,155 | A | * | 8/1996 | Yamamoto | 396/661 |
| 6,312,169 | B1 | * | 11/2001 | Keilegom et al. | 396/517 |
| 6,604,633 | B2 | * | 8/2003 | Otsuka | 206/455 |
| 6,669,363 | B2 | * | 12/2003 | Nakajo | 378/182 |

* cited by examiner

*Primary Examiner*—Alan Mathews
(74) *Attorney, Agent, or Firm*—Sughrue Mion, PLLC

(57) ABSTRACT

An X-ray film package includes a protective cover for sandwiching plural X-ray films stacked on one another, to obtain a cover-fitted sheet stack. A packaging bag contains the cover-fitted sheet stack. A packaging case contains the packaging bag with the cover-fitted sheet stack contained therein. A producing history managing method for the X-ray film package is provided. A producing history bar code is printed to the protective cover, the producing history bar code being obtained according to producing or packaging of the X-ray films. Also, the producing history bar code is printed to the packaging bag, and to the packaging case.

28 Claims, 15 Drawing Sheets

FIG. 6

SLIT NO. ⟶

FEEDING LENGTH ↓

| | S1 | S2 | S3 | S4 | S5 | S6 | FEEDING LENGTH |
|---|---|---|---|---|---|---|---|
| FILM NO. | 1101** | 1201** | 1301** | 1401** | 1501** | 1601** | |
| COVER NO. | 1101** | 1201** | 1301** | 1401** | 1501** | 1601** | |
| BAG NO. | 1101** | 1201** | 1301** | 1401** | 1501** | 1601** | 0~45m |
| CASE NO. | 1101** | 1201** | 1301** | 1401** | 1501** | 1601** | |
| CONTAINER NO. | 1101** | 1201** | 1301** | 1401** | 1501** | 1601** | |
| FILM NO. | 1102** | 1202** | 1302** | 1402** | 1502** | 1602** | |
| COVER NO. | 1102** | 1202** | 1302** | 1402** | 1502** | 1602** | |
| BAG NO. | 1102** | 1202** | 1302** | 1402** | 1502** | 1602** | 45~90m |
| CASE NO. | 1102** | 1202** | 1302** | 1402** | 1502** | 1602** | |
| CONTAINER NO. | 1102** | 1202** | 1302** | 1402** | 1502** | 1602** | |
| FILM NO. | 1103** | 1203** | 1303** | 1403** | 1503** | 1603** | |
| COVER NO. | 1103** | 1203** | 1303** | 1403** | 1503** | 1603** | |
| BAG NO. | 1103** | 1203** | 1303** | 1403** | 1503** | 1603** | 90~135m |
| CASE NO. | 1103** | 1203** | 1303** | 1403** | 1503** | 1603** | |
| CONTAINER NO. | 1103** | 1203** | 1303** | 1403** | 1503** | 1603** | |
| FILM NO. | 1104** | 1204** | 1304** | 1404** | 1504** | 1604** | |
| COVER NO. | 1104** | 1204** | 1304** | 1404** | 1504** | 1604** | |
| BAG NO. | 1104** | 1204** | 1304** | 1404** | 1504** | 1604** | 135~180m |
| CASE NO. | 1104** | 1204** | 1304** | 1404** | 1504** | 1604** | |
| CONTAINER NO. | 1104** | 1204** | 1304** | 1404** | 1504** | 1604** | |
| FILM NO. | 1105** | 1205** | 1305** | 1405** | 1505** | 1605** | |
| COVER NO. | 1105** | 1205** | 1305** | 1405** | 1505** | 1605** | |
| BAG NO. | 1105** | 1205** | 1305** | 1405** | 1505** | 1605** | 180~225m |
| CASE NO. | 1105** | 1205** | 1305** | 1405** | 1505** | 1605** | |
| CONTAINER NO. | 1105** | 1205** | 1305** | 1405** | 1505** | 1605** | |
| | | | | | | | |
| FILM NO. | 1166** | 1266** | 1366** | 1466** | 1566** | 1666** | |
| COVER NO. | 1166** | 1266** | 1366** | 1466** | 1566** | 1666** | |
| BAG NO. | 1166** | 1266** | 1366** | 1466** | 1566** | 1666** | 2925~2970m |
| CASE NO. | 1166** | 1266** | 1366** | 1466** | 1566** | 1666** | |
| CONTAINER NO. | 1166** | 1266** | 1366** | 1466** | 1566** | 1666** | |

PRODUCING HISTORY MANAGING METHOD AND SYSTEM FOR PHOTOSENSITIVE SHEET PACKAGE

BACKGROUND OF THE INVENTION

1. Field of the Invention

The present invention relates to a producing history managing method and system for a photosensitive sheet package. More particularly, the present invention relates to a producing history managing method and system for a photosensitive sheet package, in which producing history data can be checked easily and correctly without errors.

2. Description Related to the Prior Art

There are medical photosensitive films, which are photosensitive sheets including X-ray film used directly for photographing an image, and image recording film for use with an image outputting device such as a laser imager and the like. To package the photosensitive sheets, a plurality of the photosensitive sheets are stacked on one another. A protective cover of thick cardboard is used to sandwich the stack of the photosensitive sheets. The photosensitive sheets with the protective cover is wrapped in a packaging bag. Then a packaging case is used to accommodate the packaging bag with the photosensitive sheets. A plurality of the packaging cases are contained in a container for shipment.

A system for producing and packaging the photosensitive sheets includes a slitting process, a cutting/stacking process, a bag inserting process, a case inserting process and a container inserting process. In the slitting process, photosensitive sheet web with a great width is unwound from a master roll, and slitted into continuous sheets with a regular width of the product, to form slit rolls. In the cutting/stacking process, each continuous sheet is unwound from a slit roll, and cut to obtain the photosensitive sheets. The photosensitive sheets are stacked in a regular number of sheets, and then sandwiched by the protective cover. In the bag inserting process, the photosensitive sheets with the protective cover is inserted into the packaging bag. In the case inserting process, the packaging bag is inserted into the packaging case. In the container inserting process, packaging cases in a predetermined number are contained in a container of containerboard.

The photosensitive sheets at the time of the shipment is provided with producing history data for the purpose of defects in the product on sale. A technique of managing the producing history is disclosed in JP-A 5-051021. In a cross cutting process, a continuous sheet is cut crosswise. The photosensitive sheets are stacked for a unit of packaging. Data required for the slit roll stored in the control device is transferred to devices in a packaging process which is installed after the cross cutting process. In the packaging process, the photosensitive sheets are wrapped in the packaging bag. Also the required data of the slit roll is printed on the packaging bag. The producing history of the photosensitive sheets is managed by checking the printed data of the packaging bag in comparison with the required data of the slit roll.

All the photosensitive sheets packaged together are set in the image outputting device. After the setting, the packaging bag and the packaging case are discarded. Thus, the method of JP-A 5-051021 has a problem in that the producing history cannot be checked even if failure of the photosensitive sheets is detected at the time of development in the image outputting device. It is impossible in a commercial point of view to overcome the problem of dealing the defective products of the photosensitive sheets.

If failure in the product in the course of distribution, the container and the packaging case must be opened before the producing history data on the packaging bag can be observed. This causes very low efficiency in checking the producing history. Furthermore, the checking is obliged to open the packaging case even containing completely acceptable products. It is impossible to ship the packaging case as merchandise when opened.

To transfer the data from the cross cutting machine to the packaging process, data tracking is used. In the data tracking, a state of feeding of objects is detected, so as to shift the data by means of the software. To detect the objects, it is general to use a photoelectric switch. However, there is a problem in that errors are likely to occur in the detection of the photoelectric switch due to offsetting of an optical axis and sticking of fine dust or particles. Information related to the data tracking is likely to deviate.

When data are transferred between devices of which control units are different from one another, time differences of the data tracking are likely to occur due to delay in the communication. To suppress the time differences of the data tracking, hand shake is used in the data communication software. Also, error detecting software is required for detecting errors in the data tracking. This complicates the control for the transfer of the data. Furthermore, operators must operate manually between the processes typically when there is no automation in the entirety of the line. Thus, it is impossible to transfer the data.

SUMMARY OF THE INVENTION

In view of the foregoing problems, an object of the present invention is to provide a producing history managing method and system for a photosensitive sheet package, in which producing history data can be checked easily, and with sufficient correctness without errors.

In order to achieve the above and other objects and advantages of this invention, a producing history managing method for a photosensitive sheet package is provided. The photosensitive sheet package includes a protective cover for sandwiching plural photosensitive sheets stacked on one another, to obtain a cover-fitted sheet stack, a packaging bag for containing the cover-fitted sheet stack, and a packaging case for containing the packaging bag with the cover-fitted sheet stack contained therein. In the producing history managing method, producing history data is printed to the protective cover, the producing history data being obtained according to producing or packaging of the photosensitive sheets. The producing history data is printed to the packaging bag. The producing history data is printed to the packaging case.

Furthermore, plural packaging cases are contained into an outer packaging container, each of the plural packaging cases having the packaging bag contained therein. The producing history data are printed to the packaging container.

Furthermore, the producing history data is read from the protective cover, the producing history data being adapted to printing to the packaging bag. The producing history data is read from the packaging bag, the producing history data being adapted to printing to the packaging case. The producing history data is read from the packaging case, the producing history data being adapted to printing to the packaging container.

The plural photosensitive sheets are obtained by cutting a continuous sheet, and the producing history data is obtained according to obtaining the photosensitive sheets by cutting.

In another aspect of the invention, a producing history managing system for a photosensitive sheet package is provided, including a sheet cutter for producing plural photosensitive sheets by cutting a continuous sheet. A covering machine loads a protective cover with the plural photosensitive sheets stacked on one another in a sandwiched manner, to obtain a cover-fitted sheet stack. An enveloping machine contains the cover-fitted sheet stack in a packaging bag. A packing machine contains the packaging bag into a packaging case with the cover-fitted sheet stack contained therein. In the producing history managing system, a first printer prints producing history data to the protective cover, the producing history data being obtained according to operation of at least one of the sheet cutter and the covering machine. A second printer prints the producing history data to the packaging bag. A third printer prints the producing history data to the packaging case.

Furthermore, a shipment packing machine contains plural packaging cases into an outer packaging container, each of the plural packaging cases having the packaging bag contained therein. A fourth printer prints the producing history data to the packaging container.

Furthermore, a first data reader reads the producing history data from the protective cover, the producing history data being adapted to printing to the packaging bag. A second data reader reads the producing history data from the packaging bag, the producing history data being adapted to printing to the packaging case. A third data reader reads the producing history data from the packaging case, the producing history data being adapted to printing to the packaging container.

Furthermore, a production control unit manages operation of the sheet cutter, the covering machine, the enveloping machine and the packing machine, and outputs the producing history data.

The production control unit further determines first auxiliary data related to containing of the cover-fitted sheet stack into the packaging bag, and determines second auxiliary data related to containing of the packaging bag into the packaging case. Furthermore, a first memory stores first renewed history data by adding the first auxiliary data to the producing history data. A second memory stores second renewed history data by adding the second auxiliary data to the first renewed history data. The second printer prints the first renewed history data to the packaging bag, and the third printer prints the second renewed history data to the packaging case.

The producing history data for the packaging container is determined by selection among plural sets of the second renewed history data printed on the plural packaging cases.

The production control unit further determines third auxiliary data related to containing of the packaging case into the packaging container. Furthermore, a third memory stores third renewed history data determined by adding the third auxiliary data to the second renewed history data. The fourth printer prints the third renewed history data to the packaging container.

The second data reader reads the first renewed history data, and the third data reader reads the second renewed history data.

Furthermore, a web slitter produces the continuous sheet by slitting web from a master roll, to wind the continuous sheet to form a slit roll, wherein the sheet cutter is supplied with the continuous sheet by unwinding from the slit roll. A production managing unit manages the production control unit and the web slitter.

Furthermore, a data imprinting device is positioned upstream from the covering machine, for recording the producing history data to the photosensitive sheets by exposure.

The producing history data is a bar code.

The sheet cutter, the covering machine, the enveloping machine, the packing machine and the shipment packing machine respectively output first data representing a production number of the photosensitive sheets or the cover-fitted sheet stack, or a failure product number of failing ones of the photosensitive sheets or the cover-fitted sheet stack. The production control unit determines second data according to the first data, and the second data is adapted to managing a producing history.

The production managing unit creates producing history managing table data in which plural values of the producing history data are arranged in a matrix form, and are associated with respectively one particular cover-fitted sheet stack.

The producing history data has plural portions including a slit number data portion associated with the slit roll. A packaging unit data portion is associated with the cover-fitted sheet stack.

The plural portions further include an instruction data portion adapted to designating a post-treating step to be effected after operation of at least one of the sheet cutter, the covering machine, the enveloping machine, the packing machine and the shipment packing machine.

The post-treating step is at least one of plural steps including a step of producing a sticker in association with the cover-fitted sheet stack, and a step of, if the photosensitive sheets or the cover-fitted sheet stack is detected failing, eliminating the photosensitive sheets or the cover-fitted sheet stack being failing.

The matrix form includes plural lines and plural columns, each of the plural columns is associated with the slit roll, each of the plural lines is associated with one series of the photosensitive sheet at a predetermined number.

A set of the producing history managing table data is associated with the master roll being single.

The plural portions further include a producing lot number data portion associated with the master roll.

BRIEF DESCRIPTION OF THE DRAWINGS

The above objects and advantages of the present invention will become more apparent from the following detailed description when read in connection with the accompanying drawings, in which:

FIG. 6 is a chart illustrating an example of producing history managing table data;

DETAILED DESCRIPTION OF THE PREFERRED

Embodiment(S) of the Present Invention

Figure 1:
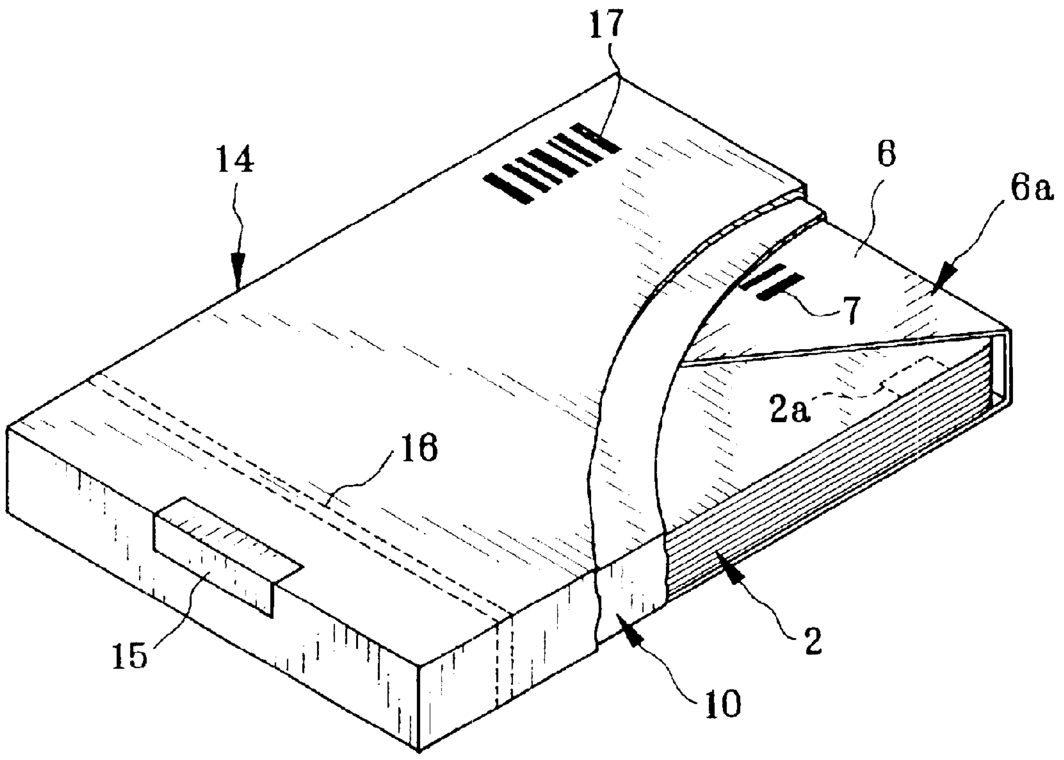
FIG. 1 is a perspective, partially cutaway, illustrating a packaged state of photosensitive sheets or X-ray films.
Figure 2:
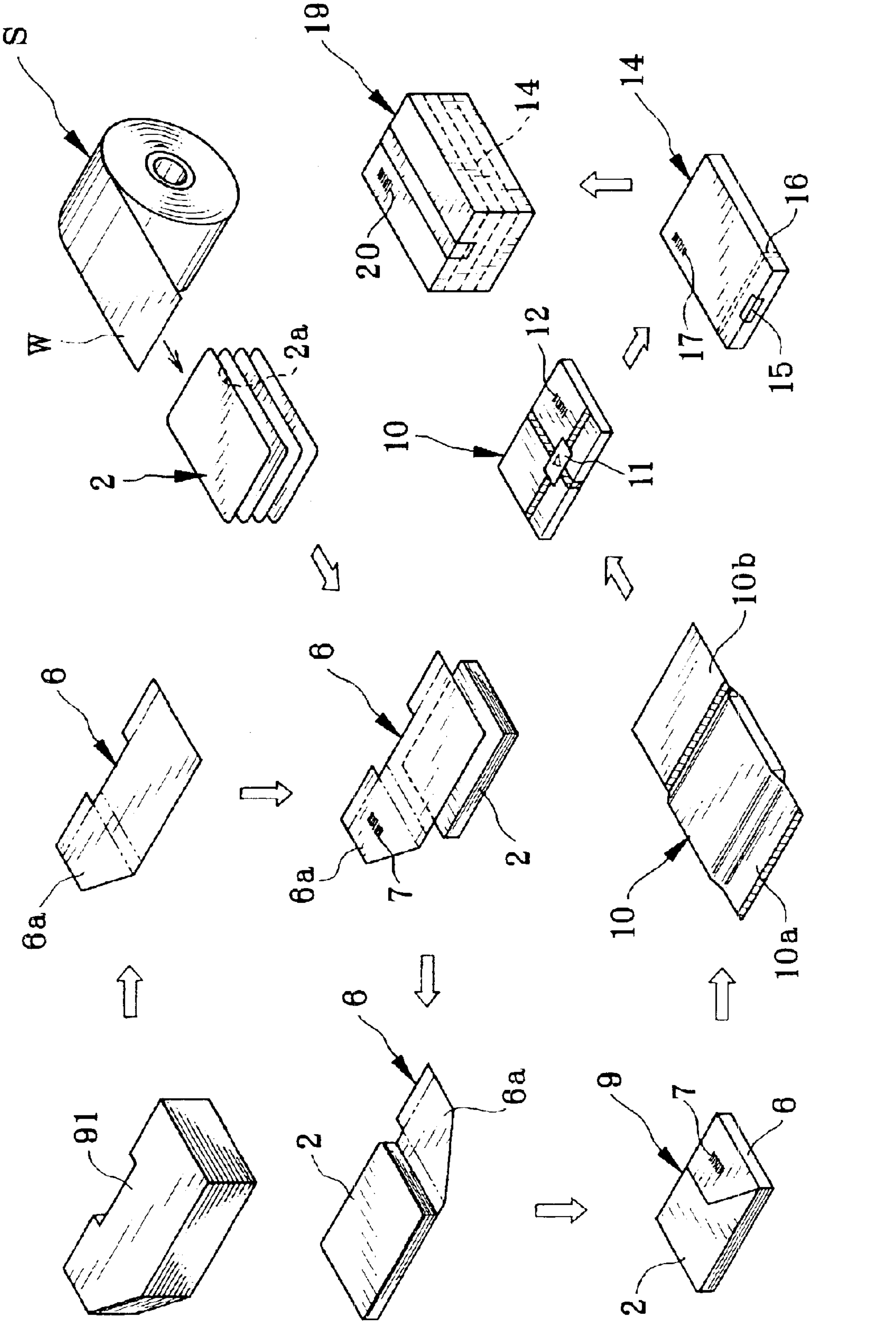
FIG. 2 is a perspective illustrating a process of producing and packaging the photosensitive sheets.

In FIG. 1, a packaged state of X-ray films of the H size is illustrated. In FIG. 2, processes of production and packaging of the X-ray films are illustrated schematically. A continuous sheet W of a limited width equal to that of the product sheet is prepared at first, and is cut at a regular length to obtain sheets. Four corners of the sheets are cut in a round shape, to form photosensitive sheets 2 or X-ray films as products. A data recording region 2*a* at an edge of the photosensitive sheets 2 is provided with a producing history bar code in a latent image form for representing producing history data of a master roll, which include a producing lot number, a slit number and an additional number. A predetermined number of the photosensitive sheets 2, for example 100, are contained regularly in each sheet package as a unit number.

A protective cover 6 of cardboard or containerboard is used for sandwiching the photosensitive sheets 2 in the predetermined number, and protects those from being folded or locally pressurized. The photosensitive sheets 2 are set in an image outputting device in a state sandwiched in the protective cover 6. A protective surface 6*a* of the protective cover 6 has a small size so as not to interfere with a supply roller of the image outputting device. In the protective surface 6*a* of the protective cover 6, a producing history bar code 7 is printed and represents the producing history data the same as that imprinted to the photosensitive sheets 2. In the protective cover 6, instruction data to be used in one of subsequent processes is printed in addition to the producing history data.

A cover-fitted sheet stack 9 is inserted and enclosed in a packaging bag 10 having opacity and moisture proofness. When the packaging bag 10 is formed by the pillow type packaging, fillets 10*a* and 10*b* of a great size are formed at front and rear ends thereof. A sticker 11 is attached to the packaging bag 10 after the fillets 10*a* and 10*b* are folded on to the outside of the packaging bag 10. A producing history bar code 12 is printed on the fillet 10*b*, and constitutes information the same as that of the protective cover 6, including the producing history data and instruction data.

An inner packaging case 14 of cardboard contains the packaging bag 10 in which the cover-fitted sheet stack 9 has been inserted. A sticker 15 is attached to the packaging case 14 to keep an entrance of the packaging case 14 closed. There are perforated tear lines 16 formed in the packaging case 14 to extend from the front to the rear, and used for tearing the packaging case 14 to remove the packaging bag 10. A producing history bar code 17 is printed to the surface of the packaging case 14, and represents the producing history data and instruction data the same as the packaging bag 10.

The packaging cases 14 are regularly combined as sets of four cases. Each set of the four packaging cases is inserted in an outer packaging container 19 of containerboard. A producing history bar code 20 is printed on an upper face of the packaging container 19, and constitutes information the same as that of the packaging case 14, including the producing history data and instruction data.

Figure 3:
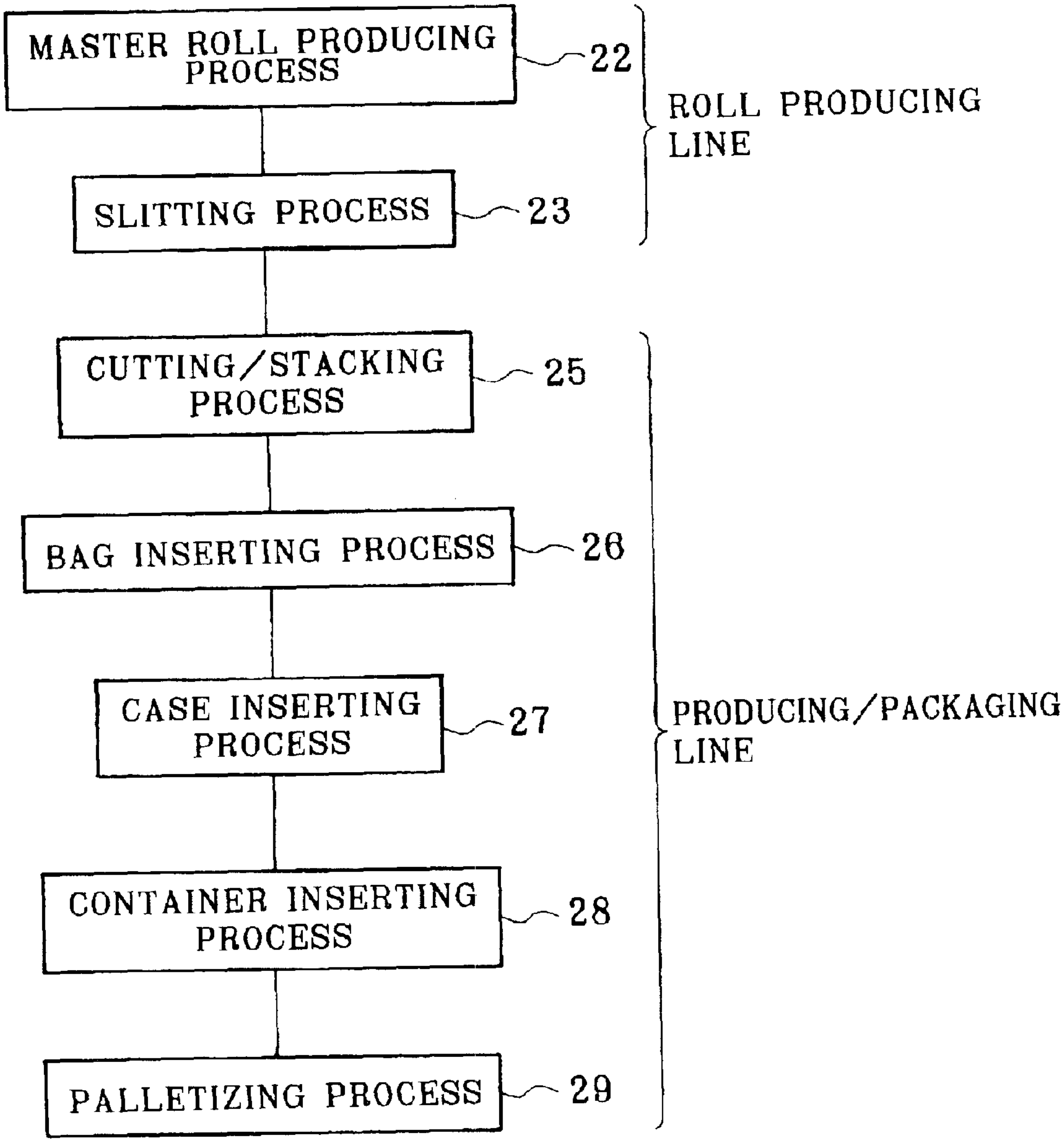
FIG. 3 is a flow chart illustrating a sequence of processes of a producing line for the photosensitive sheets.

In FIG. 3, a flow of steps in lines to produce the photosensitive sheets 2 is illustrated. The lines include a roll producing line and a producing/packaging line. Processes in the roll producing line include a master roll producing process 22 and a slitting process 23. In the master roll producing process 22, web of plastic film with a great width is coated with emulsion and dried, to obtain a master roll. In the slitting process 23, the web from the master roll is slitted to form a continuous sheet, which is wound in a form of the slit roll S.

The producing/packaging line is constituted by a cutting/stacking process 25, a bag inserting process 26, a case inserting process 27, a container inserting process 28, and a palletizing process 29. In the cutting/stacking process 25, the photosensitive sheets 2 are formed by cutting the continuous sheet from the slit roll S. Also, a stack of the photosensitive sheets 2 is sandwiched by portions of the protective cover 6 to form the cover-fitted sheet stack 9. In the bag inserting process 26, the cover-fitted sheet stack 9 is inserted in the packaging bag 10. In the case inserting process 27, the packaging bag 10 is inserted in the packaging case 14. In the container inserting process 28, a plurality of the packaging cases 14 are inserted in the packaging container 19. In the palletizing process 29, the packaging container 19 is placed on a pallet in a manner classified according to the product types and addresses of shipment.

Figure 4:
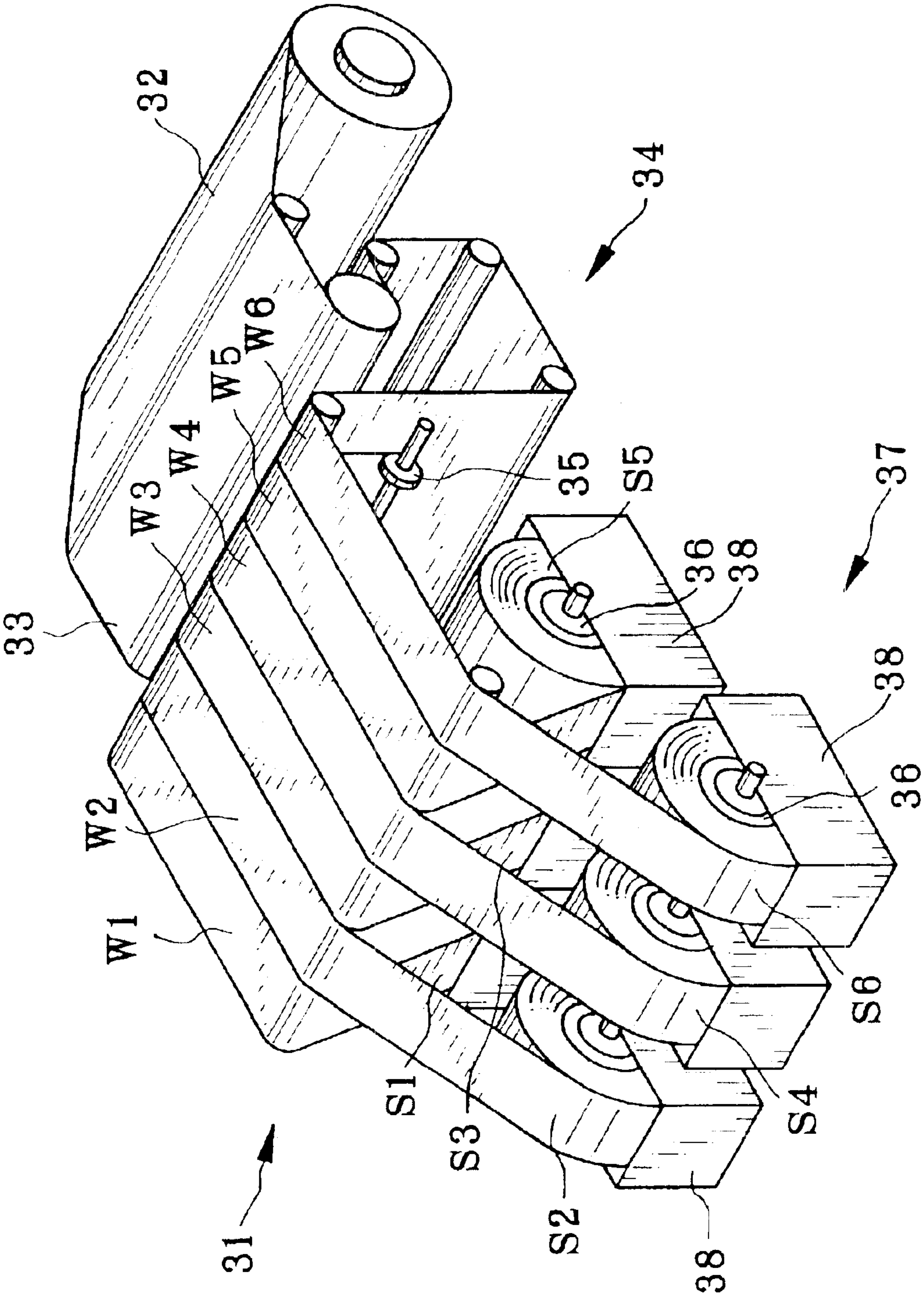
FIG. 4 is a perspective illustrating a web slitter.

In FIG. 4, a web slitter 31 for use in the slitting process 23 in the roll producing line is illustrated. The web slitter 31 includes a web supply mechanism 34, slitting blades 35 and a continuous sheet winding mechanism 37. The web supply mechanism 34 is provided with a master roll 32, from which web 33 is unwound and supplied by the web supply mechanism 34. The slitting blades 35 slit the web 33 being fed, and form six continuous sheets W1–W6. The continuous sheet winding mechanism 37 has spools 36, about which the continuous sheets W1–W6 are wound to form the slit rolls S1–S6. Roll receptacles 38 are disposed and used for containing the slit rolls S1–S6 while their diameter increases in a rotating operation of the spools 36 set through the roll receptacles 38.

Figure 5:
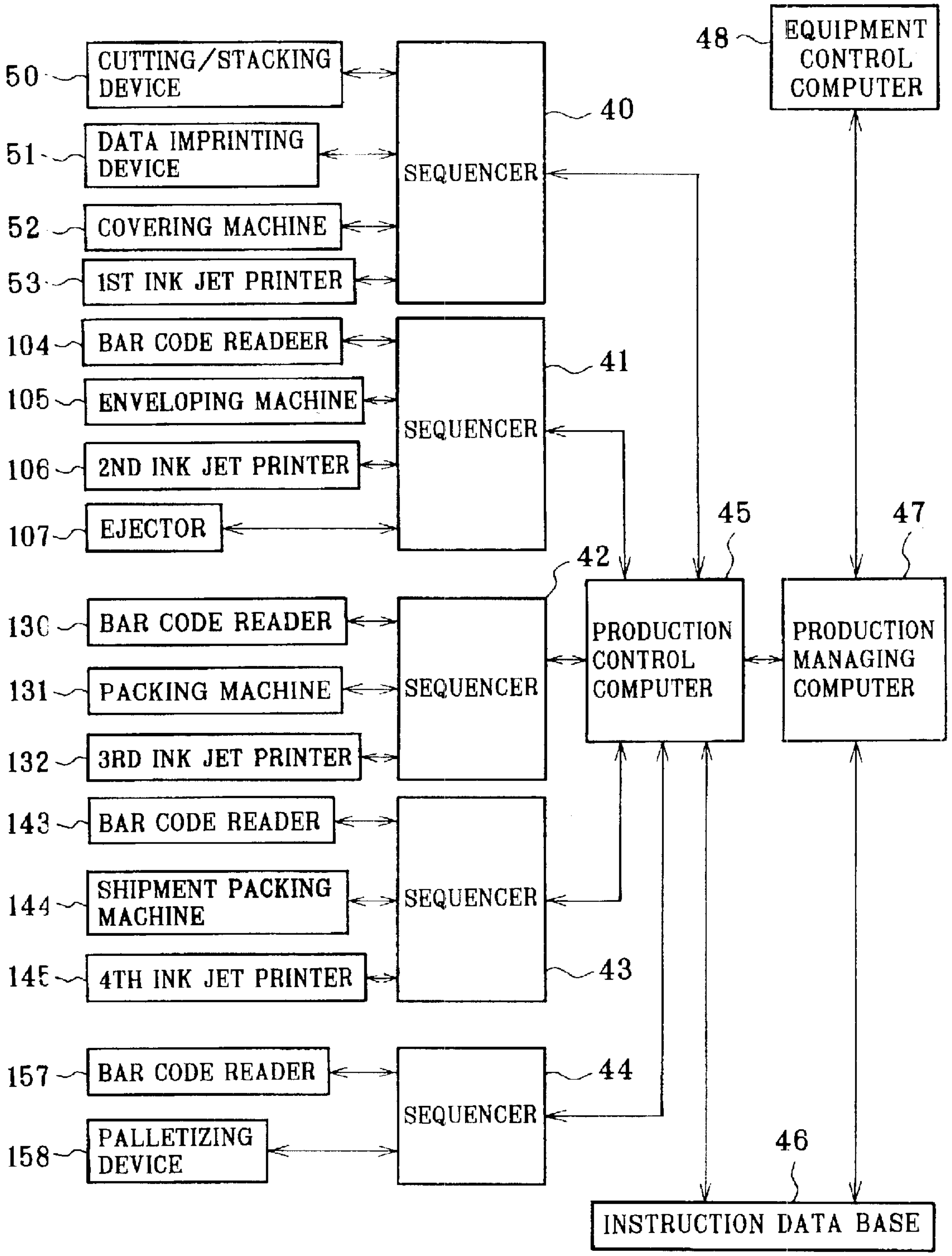
FIG. 5 is a block diagram schematically illustrating a producing/packaging line.

In FIG. 5, the producing/packaging line is schematically illustrated. There are sequencers 40, 41, 42, 43 and 44 for controlling devices assigned with the processes. A production control computer 45 is connected for administrating the sequencers 40–44. An instruction data base 46 is connected with the production control computer 45, and has data of instructions in the production. The sequencers 40–44 are controlled according to the instruction data sent out by the instruction data base 46.

A production managing computer 47 manages the production control computer 45. Furthermore, an equipment control computer 48 for the roll producing line is managed by the production managing computer 47. A factory local network is established by those three.

The production managing computer 47 sends production planning data to each of the equipment control computer 48 and the production control computer 45. The production managing computer 47 receives inputs of the production planning data, and data relevant to plans of warehousing and shipping of materials including raw materials and parts, or data relevant to results of warehousing and shipping of the materials.

Also, a memory in the production managing computer 47 stores prescription tables previously determined for respectively types of medical photographic films to be produced. Abbreviated names are assigned the prescription tables, and represents types of the products. Prescription data are associated with the prescription tables, the data including types of raw materials, manufacturing conditions, inspecting conditions and the like required for manufacturing medical photographic films to be produced.

The master roll 32 produced by the master roll producing process 22 is provided with the producing lot number by the equipment control computer 48. In the slitting process 23 for forming the slit roll from the master roll 32, slit numbers S1–S6 are assigned to the slit rolls by the equipment control computer 48. The producing lot number and the slit numbers are input to the production managing computer 47, and are used for creating the producing history managing data.

The master roll 32 obtained from the master roll producing process 22 is likely to have flaws or defects which are created due to irregularity in coating of the emulsion, difficulty in drying, or the like. Furthermore, while the slit roll S is formed from the master roll 32 in the slitting process 23, difficulties may occur in the web slitter 31 to an extent influencing the quality of the products. Defective portions may be discovered by surface inspection of the slitting. In such a case, the equipment control computer 48 creates defect information which includes the producing lot number of the master roll 32, the slit numbers, the length between a defective portion and a starting end of winding of the slit roll, a length of the defective portion, and the like. The defect information is sent to the production managing computer 47, and used for creating producing history managing data.

In the processes of the producing/packaging line, producing result data are sent to the production control computer 45, the data including the number of obtained products or intermediate products, the number of failing products and the like. Required portions included in the producing result data are input by the production control computer 45 to the production managing computer 47, and used for creating the producing history managing data.

In FIG. 6, an example of the producing history managing table data or managing chart is illustrated, the producing history managing table data being created according to the producing history managing data. The producing history managing table data corresponds to the entirety of the master roll 32. The number of the slit rolls is taken on the horizontal axis. The length of the continuous sheet of the slit roll is taken on the vertical axis. There are squares disposed in the producing history managing table data in a matrix form, to correspond to respectively 100 sheets that is a unit of packaging of the photosensitive sheets 2. Sets of the producing history data to be printed are indicated in respectively squares, in a regularized manner for the photographic films, the protective cover, the bag, the case and the container.

Figure 7:
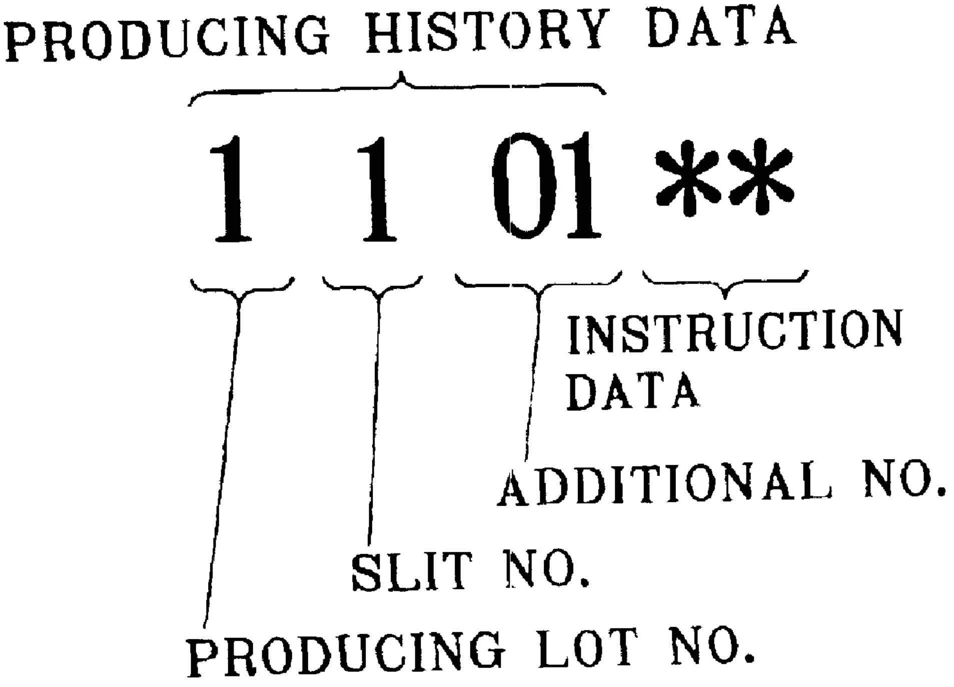
FIG. 7 is an explanatory view illustrating an example of producing history data.

For example, photosensitive sheets obtained from the slit roll S1 in a range of the feeding length of 0–45 meters is associated with the producing history data of "1101". A bar code of this data is imprinted photographically. In FIG. 7, the first digit of the producing history data is used to represent the producing lot number of the master roll 32**. The second digit of the same is used to represent the slit number. The third and fourth digits are used to represent additional numbers, which are assigned to each unit of packaging of the photosensitive sheets, and start from the leading end of the slit roll. According to the producing history data, it is possible to determine a particular master roll and slit roll from which the sheets are formed, and determine positions where the sheets are formed in the slit roll.

The fifth and remaining digits are used to represent instruction data. The number of the digits for this is determined as desired according to requirement of the instructions. The instruction data is used to designate operation required in any one of subsequent processes. Examples of the instruction data are issuance of a sticker, instruction of elimination, and the like. The elimination instruction is assigned to the unit of packaging of the films having defective portions, and is used as information for ejecting the film as a failing product.

The producing history data and the instruction data of the photosensitive sheets 2 are combined with added portions of producing history data, and are printed to the protective cover 6, the packaging bag 10, the packaging case 14 and the packaging container 19 in a form of the bar code 7, 12, 17, 20. Thus, the producing history data can be check no matter how the photosensitive sheets are wrapped. The producing history of the sheets can be checked easily by referring to the producing history managing table data.

Figure 8:
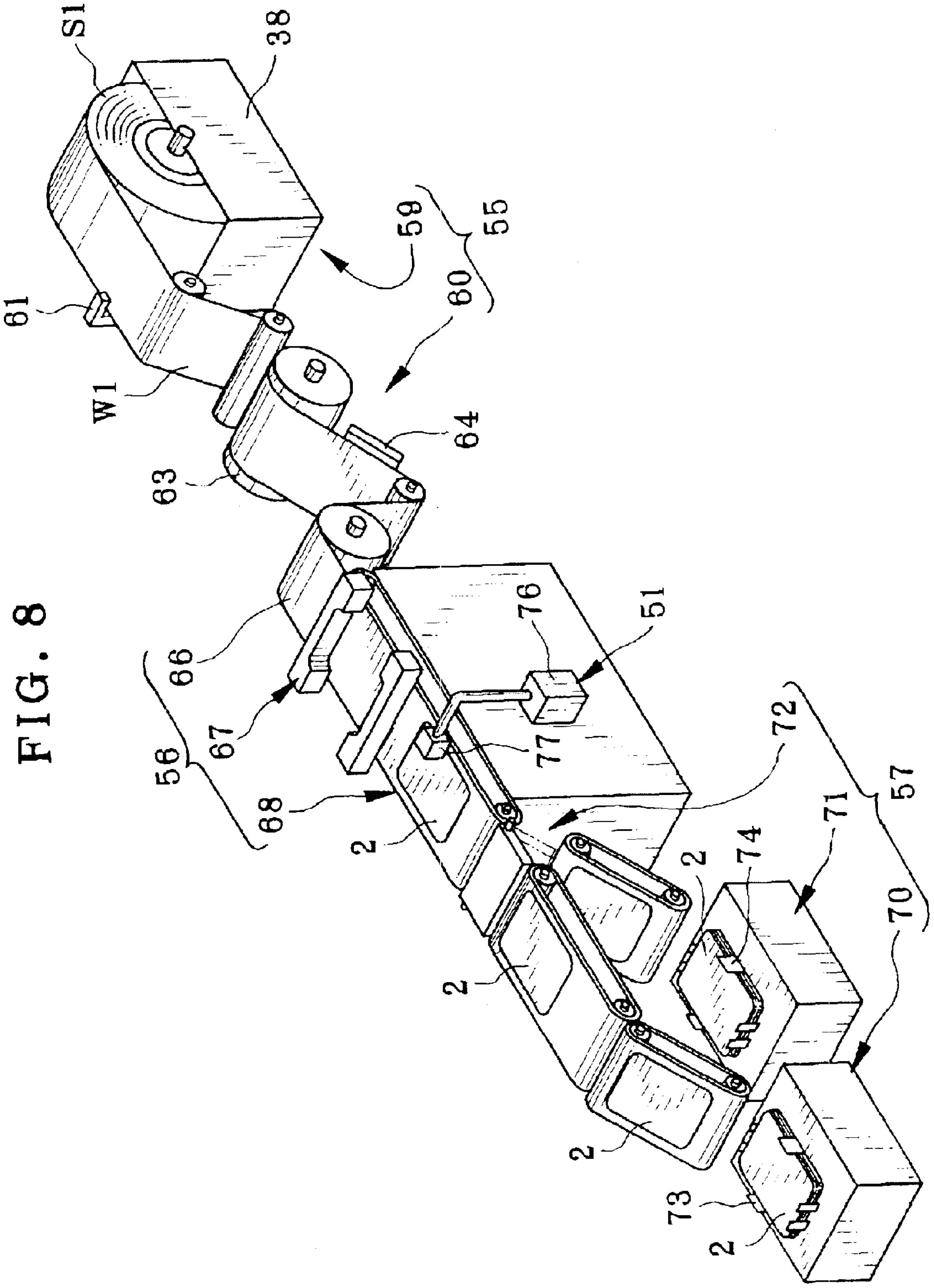
FIG. 8 is a perspective illustrating a cutting/stacking device.

In FIG. 5, devices for the cutting/stacking process include a cutting/stacking device 50, a data imprinting device 51 of a laser imprinting type, a covering machine 52 and a first ink jet printer 53. In FIG. 8, the structure of the cutting/stacking device 50 is depicted. The cutting/stacking device 50 includes an unwinder 55, a simultaneous round corner cutter or sheet cutter 56, and a sheet counter/stacker 57.

The unwinder 55 is constituted by an unwinding unit 59 and a decurling unit 60. The roll receptacle 38 containing the slit roll S1 is set in the unwinding unit 59. The continuous sheet W1 is subjected to tension at a regular level while unwound from the slit roll S1. A photoelectric sensor 61 is disposed in the unwinding unit 59 for-detecting a zigzag movement of the continuous sheet W1. According to a zigzag state of the continuous sheet W1 detected by the photoelectric sensor 61, the position of the slit roll S1 is adjusted in the width direction.

The decurling unit 60 is constituted by a heating roller 63 and a cooler 64. The heating roller 63 is driven to generate heat at a temperature not influencing the continuous sheet W1, and eliminates curls from the continuous sheet W1. The continuous sheet W1 after being uncurled is cooled by the cooler 64, so the uncurled state is maintained. A dancer roller 65 is positioned upstream from the heating roller 63, and absorbs fine changes in the tension of the continuous sheet W1.

The sheet cutter 56 includes a suction drum 66, a rotary oscillation cutter mechanism 67, and a feeder 68. The suction drum 66 feeds the continuous sheet W1 at a regular length. The rotary oscillation cutter mechanism 67 operates in synchronism with the suction drum 66 both electrically and mechanically. The feeder 68 feeds the photosensitive sheets 2. In FIG. 2, the rotary oscillation cutter mechanism 67 cuts the continuous sheet W1 at a predetermined length, and at the same time forms arc-shaped corners by rounding off, to obtain the photosensitive sheets 2. An example of the feeder 68 is constituted by a conveyor belt, which feeds the photosensitive sheets 2 toward the sheet counter/stacker 57.

The sheet counter/stacker 57 includes stacking stations 70 and 71 and a sorting gate 72. The stacking stations 70 and 71 stack the photosensitive sheets 2 from the sheet cutter 56. The sorting gate 72 advances the photosensitive sheets 2 to the stacking stations 70 and 71 in a sorted manner. Stacking frames 73 and 74 are disposed on the upside of the stacking stations 70 and 71, and receive stacking of the photosensitive sheets 2. A lower portion of the stacking frames 73 and 74 is partially open for picking up and removing the photosensitive sheets 2 placed on the stacking frames 73 and 74.

The sorting gate 72 includes a sorting plate and an actuator. The sorting plate is movable between the first position indicated by the solid line, and the second position indicated by the phantom line. The actuator moves the sorting plate, and is constituted by an air cylinder or the like. The sorting gate 72 is changed over in consideration of a stacking state of the stacking stations 70 and 71, to select one of the paths for the photosensitive sheets 2.

The data imprinting device 51 is disposed close to the rotary oscillation cutter mechanism 67. The data imprinting device 51 is constituted by an imprinting main unit 76 and an exposure head 77, which is connected with the imprinting main unit 76 and disposed above the feeder 68. The exposure head 77 photographically records a bar code to the data recording region 2*a* of the photosensitive sheets 2.

If the remainder of the continuous sheet W1 from the slit roll S1 during the use decreases and comes near to zero in the cutting/stacking device 50, then the remainder of the continuous sheet W1 is discharged from the cutting/stacking device 50. A new slit roll S2 is set. The selection information of the slit roll is sent by the production control computer 45 to the production managing computer 47, and considered to determine the producing history managing data. It is unnecessary to track the selection of the slit roll.

For some reason, it happens that the photosensitive sheets 2 from the slit roll S1 and the photosensitive sheets 2 from the slit roll S2 come to constitute a single sheet stack as a unit of packaging. See FIG. 9. In such a case, the two sets of the producing history data are recorded to the protective cover 6, the packaging bag 10, the packaging case 14 and the packaging container 19.

Figure 10:
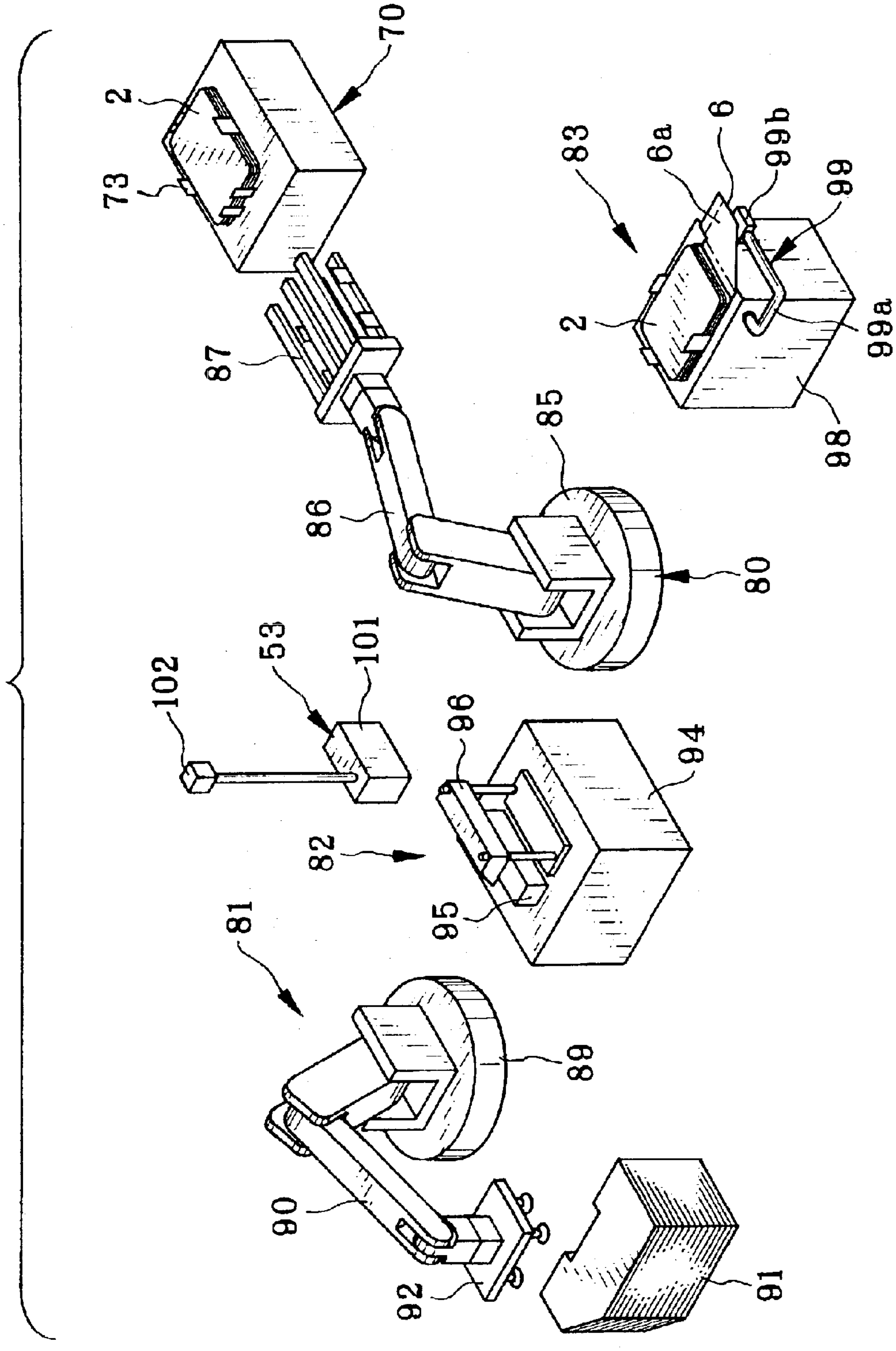
FIG. 10 is a perspective illustrating a covering machine.

In FIG. 10, a construction of the covering machine 52 is illustrated. The covering machine 52 includes a sheet handling robot 80, a cover handling robot 81, a pre-bender mechanism 82 and a bender mechanism 83. The sheet handling robot 80 picks up a stack of the photosensitive sheets 2 in the predetermined number of the unit package from the stacking frames 73 and 74 of the stacking stations 70 and 71. The cover handling robot 81 retains the protective cover 6. The pre-bender mechanism 82 pre-bends the protective cover 6. The bender mechanism 83 bends the protective cover 6 to sandwich and capture the photosensitive sheets 2.

The sheet handling robot 80 consists of a multi-purpose multi-axis robot, which includes a rotary support 85, an arm 86 and a chuck 87. The arm 86 is bendable on the rotary support 85. The chuck 87 is secured to an end of the arm 86, and sandwiches and captures the photosensitive sheets 2.

The cover handling robot 81 is a multi-purpose multi-axis robot the same as the sheet handling robot 80, and includes a rotary support 89, an arm 90 and suction pads 92. The arm 90 is bendable with respect to the rotary support 89. The suction pads 92 are disposed on an end portion of the arm 90, and suck and retain an upper one of cover materials 91 in a stack by air suction and the like.

The pre-bender mechanism 82 includes a stage 94, a stationary component 95, a movable component 96 and a moving mechanism (not shown). The stationary component 95 is fixedly supported on the stage 94. The movable component 96 moves up and down to contact an end face of the stationary component 95. The moving mechanism moves the movable component 96.

The bender mechanism 83 includes a stage 98 and a bender arm 99. The stage 98 supports a set of the protective cover 6 and the photosensitive sheets 2 stacked thereon. The bender arm 99 bends the panel of the protective cover 6 at the protective surface 6*a* to the upside of the photosensitive sheets 2. The bender arm 99 has substantially a channel shape, and includes an arm portion 99*a*, a bender pad 99*b* and a rotating mechanism (not shown). The arm portion 99*a* has first and second ends, the first end being secured to a lateral panel of the stage 98 in a rotatable manner. The bender pad 99*b* is secured to the second end of the arm portion 99*a*. The rotating mechanism rotates the arm portion 99*a*.

Figure 11:
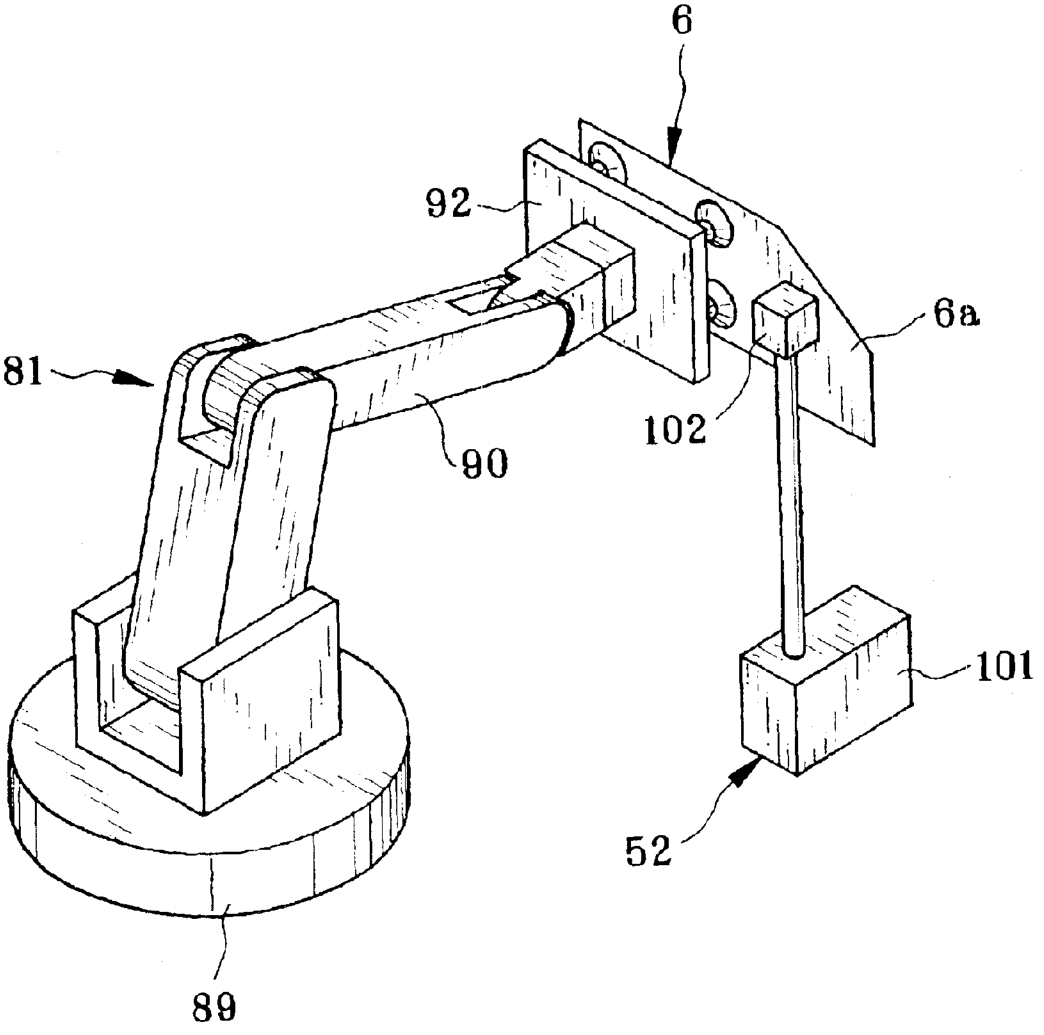
FIG. 11 is a perspective illustrating a state of printing a bar code in the covering machine.

The first ink jet printer 53 is disposed close to the covering machine 52. The first ink jet printer 53 includes a printer main unit 101 and a printhead 102 connected with the printer main unit 101. In FIG. 11, the producing history bar code 7 is printed to the protective surface 6*a* of the protective cover 6 retained by the cover handling robot 81. A printing surface of the protective cover 6 is kept oriented vertically while the producing history bar code 7 is printed. This is for the purpose of preventing the protective cover 6 from being polluted and damaged by surplus ink dropping from the printhead 102 in the first ink jet printer 53.

Figure 12:
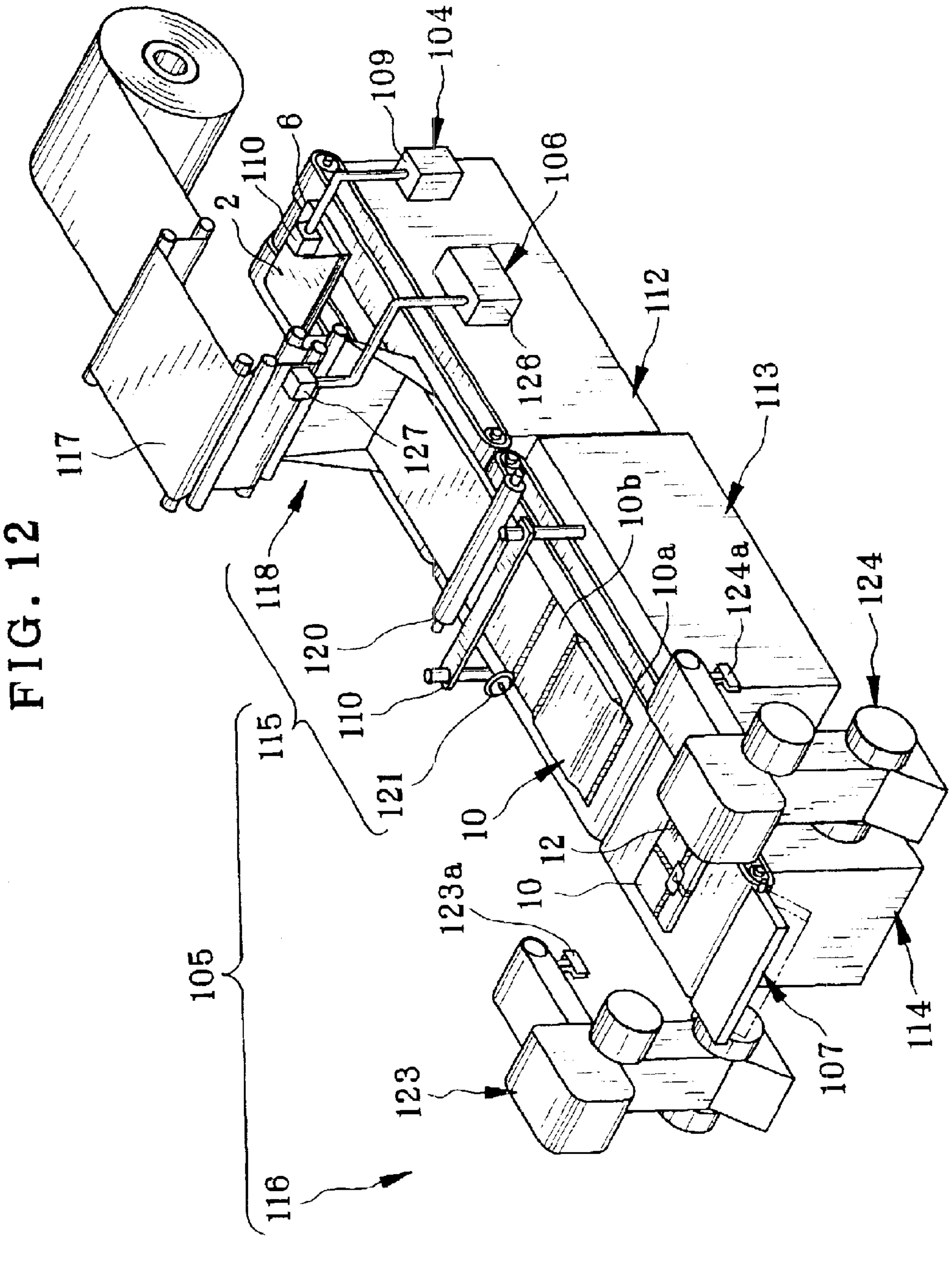
FIG. 12 is a perspective illustrating an enveloping machine and an ejector.

Elements for the bag inserting process include a bar code reader 104, an enveloping machine 105, a second ink jet printer 106 and an ejector 107. In FIG. 12, the bar code reader 104 includes a reader main unit 109 and a reading head 110, and reads the producing history bar code 7 from the protective surface 6*a* of the protective cover 6.

The enveloping machine 105 includes a first feeder 112, a second feeder 113, a third feeder 114, a pillow packaging mechanism 115 and a fillet folding mechanism 116. The first, second and third feeders 112, 113 and 114 feed the cover-fitted sheet stack 9 sent from the covering machine 52. The pillow packaging mechanism 115 is constituted by a film supply feeder 118, a center sealer (not shown), a cross sealer 119, a heating roller 120 and a cutter 121. The film supply feeder 118 supplies packaging film 117 which includes a plastic film and aluminum foil overlaid thereon. The center sealer is incorporated in the first feeder 112, and shapes the packaging film 117 into a tubular form by welding end portions with heat. The cross sealer 119 welds the packaging film 117 with heat in positions before and after the cover-fitted sheet stack 9. The heating roller 120 forms folds in the packaging film 117. The cutter 121 cuts the packaging film 117 in predetermined positions.

The fillet folding mechanism 116 includes two fillet folding robots 123 and 124, and a sticker attacher which is not shown. The fillet folding robots 123 and 124 are multi-purpose multi-axis robots, and have respectively robot hands 123*a* and 124*a*, which grasp the fillets 10*a* and 10*b* of the packaging bag 10, and bend those to the outside of the packaging bag 10. The fillets 10*a* and 10*b* are fixedly secured to the packaging bag 10 by attachment of the sticker 11.

The second ink jet printer 106 is disposed close to the film supply feeder 118 of the pillow packaging mechanism 115. The second ink jet printer 106 includes a printer main unit 126 and a printhead 127. The producing history data and the instruction data read from the producing history bar code 7 in the protective cover 6 are printed to the producing history bar code 12 on the surface of the packaging film 117. A portion for printing of the producing history bar code 12 is a lower surface of the fillet 10*a* at the time of forming of the packaging bag 10. When the fillet 10*a* is bent, the producing history bar code 12 becomes disposed on the upside of the packaging bag 10. Note that the producing history bar code 12 is first renewed history data, because of consideration of auxiliary history data according to the transfer of the cover-fitted sheet stack 9 to the enveloping machine 105.

Note that the printhead 127 of the second ink jet printer 106 is disposed in a section where the packaging film 117 is fed vertically. This is for the purpose of preventing the packaging film 117 from being polluted and damaged by surplus ink dropping from the printhead 127 in the second ink jet printer 106.

The ejector 107 includes a sorting plate and an actuator. The sorting plate is movable between the first position indicated by the solid line, and the second position indicated by the phantom line. The actuator moves the sorting plate, and is constituted by an air cylinder or the like. If the photosensitive sheet 2 with failure is contained, or if failure occurs in the packaging material, the packaging bag 10 is ejected from the producing line. The ejection of the packaging bag 10 by the ejector 107 is effected according to the elimination instruction included in the instruction data read by the bar code reader 104.

Figure 13:
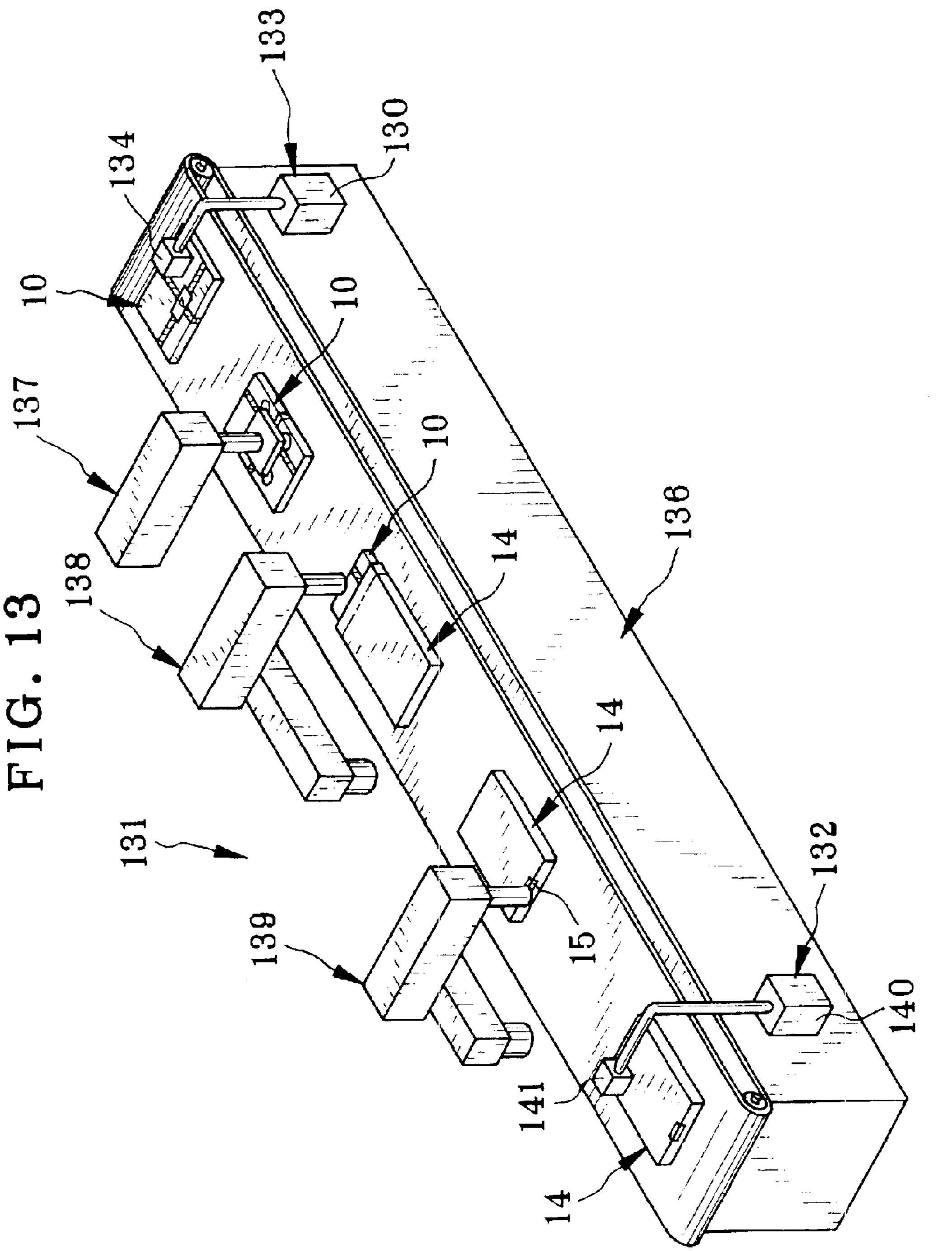
FIG. 13 is a perspective illustrating a packing machine.

Elements for the case inserting process include a bar code reader 130, a packing machine 131 and a third ink jet printer 132. In FIG. 13, the packing machine 131 includes a feeder 136, a direction changer 137, a case inserting robot 138 and a sealing robot 139. The feeder 136 feeds the packaging bag 10 intermittently. The direction changer 137 turns the packaging bag 10 by a one fourth rotation, and orients it in a different direction. The case inserting robot 138 inserts the packaging bag 10 into the packaging case 14. The sealing robot 139 closes the packaging case 14 and attaches the sticker 15 to the packaging case 14.

The bar code reader 130 is disposed close to the feeder 136, and includes a reader main unit 133 and a reading head 134. The bar code reader 130 reads the producing history bar code 12 from the packaging bag 10. The third ink jet printer 132 includes a printer main unit 140 and a printhead 141, and prints the producing history data and the instruction data in the form of the producing history bar code 17 to the surface of the packaging case 14, the data having been read from the producing history bar code 12 of the packaging bag 10. Note that the producing history bar code 17 is second renewed history data, because of consideration of auxiliary history data determined according to the transfer of the packaging bag 10 to the packaging case 14.

Figure 14:
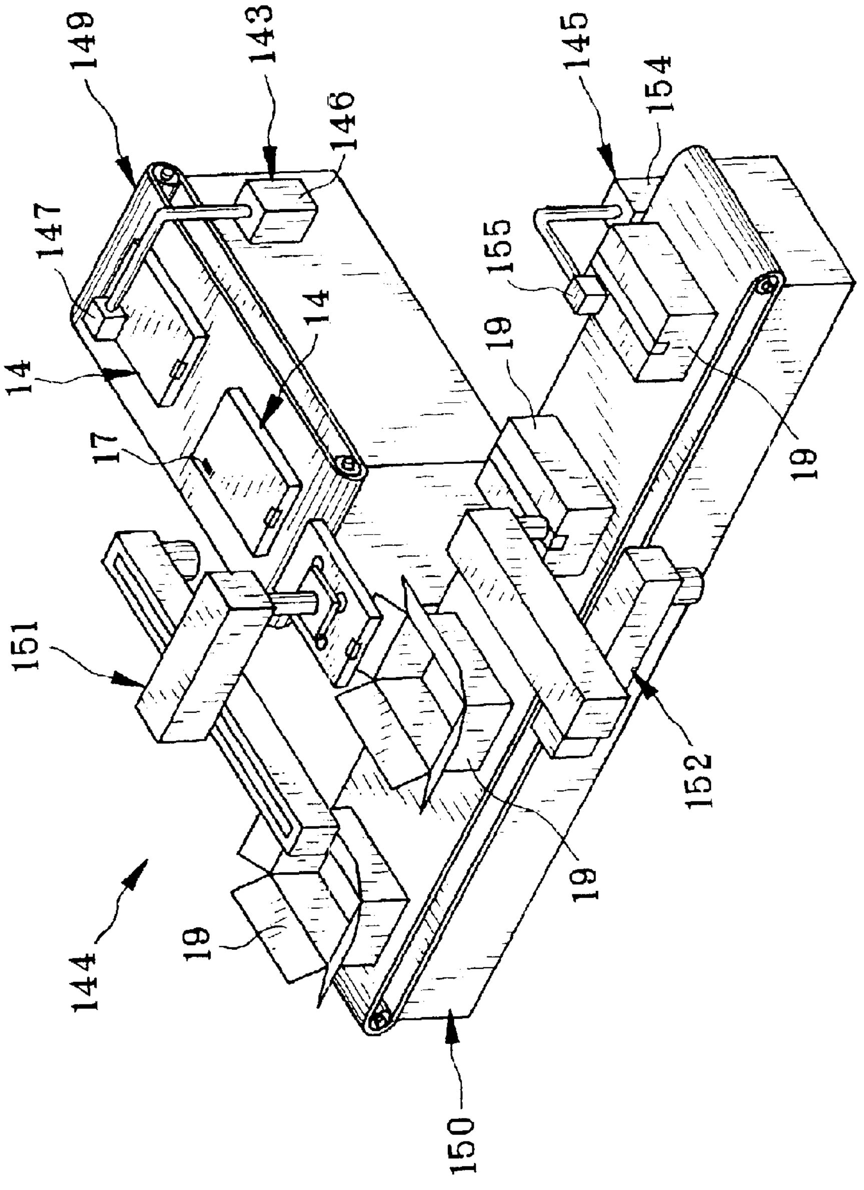
FIG. 14 is a perspective illustrating a shipment packing machine.

Elements for the container inserting process include a bar code reader 143, a shipment packing machine 144 and a fourth ink jet printer 145. In FIG. 14, the shipment packing machine 144 includes a first feeder 149, a second feeder 150, a transfer robot 151 and a sealing robot 152. The first feeder 149 feeds the packaging case 14 intermittently. The second feeder 150 feeds the packaging container 19 intermittently. The transfer robot 151 picks up the packaging case 14 from the first feeder 149, and inserts the packaging case 14 into the packaging container 19 at the second feeder 150. The sealing robot 152 closes the packaging container 19 in a tightly enclosed manner.

The bar code reader 143 is disposed close to the first feeder 149. The bar code reader 143 includes a reader main unit 146 and a reading head 147, and reads the producing history bar code 17 from the packaging case 14. The fourth ink jet printer 145 includes a printer main unit 154 and printhead 155, and is close to the second feeder 150. The fourth ink jet printer 145 prints the producing history data and the instruction data in the form of the producing history bar code 20 to the upper surface of the packaging container 19, the data having been read from the producing history bar code 17 of the packaging case 14. Note that the producing history bar code 20 is determined equal to the four sets of the producing history bar code 17 assigned to one of the packaging case 14 having the smallest serial number.

Figure 15:
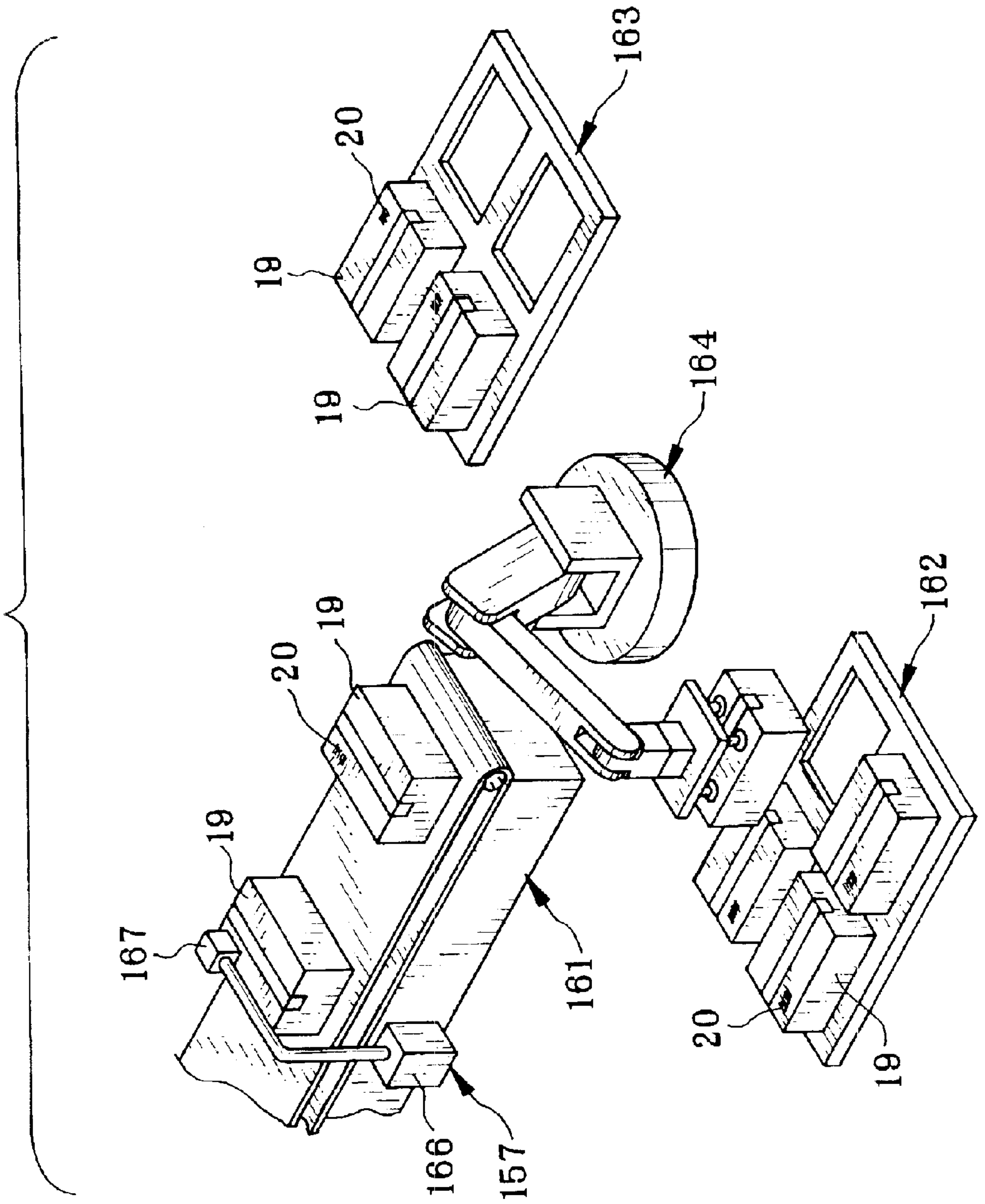
FIG. 15 is a perspective illustrating a palletizing device.

Elements for the palletizing process include a bar code reader 157 and a palletizing device 158. In FIG. 15, the palletizing device 158 includes a feeder 161 and a transfer robot 164. The feeder 161 feeds the packaging container 19 intermittently. The transfer robot 164 picks up the packaging container 19 from the feeder 161. There are pallets 162 and 163 to which the transfer robot 164 places the packaging container 19.

The bar code reader 157 is disposed close to the feeder 161, includes a reader main unit 166 and a reading head 167, and reads the producing history bar code 20 from the upper surface of the packaging container 19.

The operation of the above construction is described now. The production managing computer 47 illustrated in FIG. 5 sends the production planning data to the equipment control computer 48 and the production control computer 45. In the master roll producing process 22 of FIG. 3, the master roll 32 is produced according to the production planning data being input. A producing lot number is assigned to the master roll 32 by the equipment control computer 48.

In FIG. 4, the master roll 32 produced by the master roll producing process 22 is set in the web supply mechanism 34 of the web slitter 31. The web 33 unwound from the master roll 32 is slitted by the slitting blades 35, to form the six continuous sheets W1–W6. The continuous sheets W1–W6 are respectively wound about the spools 36 set in the continuous sheet winding mechanism 37, to form the slit rolls S1–S6. The slit numbers of the slit rolls are assigned by the equipment control computer 48.

For example, a defect occurs in a portion of the master roll 32 or any of the slit rolls S1–S6 in the master roll producing process 22 and the slitting process 23. Upon the occurrence, the equipment control computer 48 creates defect information such as the producing lot number of the master roll 32, the slit numbers, the length between a defective portion and a starting end of winding of the slit roll, a length of the defective portion, and the like.

The equipment control computer 48 sends the above producing lot number, the slit numbers and the defect information to the production managing computer 47. The production managing computer 47 creates the producing history managing table data or managing chart and the producing history data of FIGS. 6 and 7 by use of the input information. The producing history data is input to the production control computer 45.

The production control computer 45 reads the production instructing information from the instruction data base 46 according to the production planning data input by the production managing computer 47. The production control computer 45 controls the sequencers 40–44 for the plural processes according to the production instructing information.

The slit roll S1 is set into the cutting/stacking device 50 of FIG. 8 in a state contained in the roll receptacles 38. The continuous sheet W1 is advanced with tension applied thereto from the slit roll S1 set in the unwinding unit 59 of the unwinder 55 of the cutting/stacking device 50. If there occurs a zigzag movement of the continuous sheet W1, the photoelectric sensor 61 detects this. A position of the slit roll S1 is adjusted in the width direction according to the detected zigzag movement.

The continuous sheet W1 unwound from the slit roll S1 is uncurled by the heating roller 63 and the cooler 64 in the decurling unit 60. The continuous sheet W1 is then fed by the suction drum 66 of the sheet cutter 56 intermittently by a regular amount. The continuous sheet W1 is cut by the rotary oscillation cutter mechanism 67 synchronized with the suction drum 66, so the photosensitive sheets 2 are obtained.

In FIGS. 1 and 2, the data imprinting device 51 imprints a bar code photographically into the data recording region 2*a* at the end of the photosensitive sheets 2, the bar code being formed as a latent image and representing the producing history data and instructing data.

The photosensitive sheets 2 with the bar code are sorted by the sorting gate 72, and stacked on the stacking stations 70 and 71. When the photosensitive sheets 2 stacked on either one of the stacking stations 70 and 71 increase to the predetermined number, the covering machine 52 starts operation.

Figure 9:
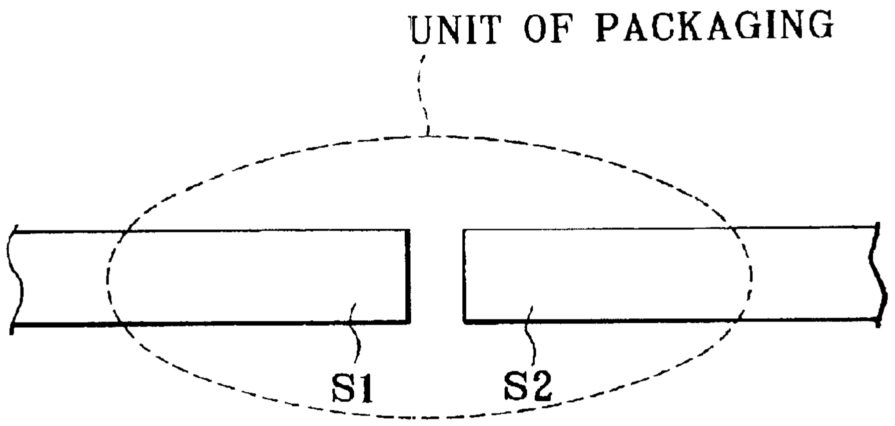
FIG. 9 is a plan, partially broken, illustrating a state in which photosensitive sheets derived from two slit rolls are combined.

After the slit roll S1 is used up, the parts remaining in the slit roll S1 are discharged from the cutting/stacking device 50. The new slit roll S2 is set. The selection information for the slit roll is sent from the sequencer 40 to the production control computer 45, and then to the production managing computer 47. In FIG. 9, a situation is illustrated in which photosensitive sheets 2 from the slit roll S1 and photosensitive sheets 2 from the slit roll S2 come to constitute a single sheet stack as a unit of packaging. In such a case, the two sets of the producing history data are recorded to the protective cover 6 in a combined manner.

In FIG. 10, joints of the arm 86 in the sheet handling robot 80 are driven to insert the chuck 87 into a lower gap of the stacking frame 73. The arm 86 picks up the photosensitive sheets 2 of the predetermined number away from the stacking frame 73. The chuck 87 sandwiches the photosensitive sheets 2, and keeps the photosensitive sheets 2 from dropping while moved.

In the cover handling robot 81, the suction pads 92 suck and retain an uppermost one of the cover materials 91 stacked previously. In FIG. 11, the cover handling robot 81 feeds the uppermost cover to the first ink jet printer 53. The first ink jet printer 53 prints the producing history bar code 7 to the cover material 91 in a position of the protective surface 6*a*. The producing history bar code 7 consists of information including the producing history data and the instruction data input by the production control computer 45, and also auxiliary producing history data generated newly in the cutting/stacking process. An example of the auxiliary history data is a flag of a normal state without an error in operation upstream from the first ink jet printer 53.

After the producing history bar code 7 is printed, the cover handling robot 81 feeds the cover material 91 to the pre-bender mechanism 82 for pre-bending. The arm 90 in the cover handling robot 81 is moved to set a bend-designated portion of the cover material 91 in the pre-bender mechanism 82. Thus, the portion is pre-bent in the protective cover 6.

The protective cover 6 after being pre-bent is inserted by the cover handling robot 81 into a space over the photosensitive sheets 2 retained by the chuck 87 of the sheet handling robot 80. In the sheet handling robot 80 with the protective cover 6, the chuck 87 squeezes the photosensitive sheets 2 and the protective cover 6, and turns those over. Thus, the photosensitive sheets 2 are disposed on the upside of the protective cover 6.

In the sheet handling robot 80, the joints of the arm 86 are driven to place the photosensitive sheets 2 with the protective cover 6 on to the stage 98 of the bender mechanism 83. Upon the placement on the stage 98, the protective surface 6*a* of the protective cover 6 is positioned on the bender pad 99*b*.

The bender mechanism 83 rotates the arm portion 99*a*. The bender pad 99*b* pushes and bends the protective surface 6*a* of the protective cover 6 toward the photosensitive sheets 2. The cover-fitted sheet stack 9 is obtained in a form where the photosensitive sheets 2 are sandwiched between portions of the protective cover 6. The producing result data is obtained in the cutting/stacking process, and sent by the sequencer 40 to the production control computer 45. The production control computer 45 sends partial data to the production managing computer 47, the partial data being extracted from the producing result data and used for creating the producing history managing data.

The cover-fitted sheet stack 9 is displaced from the bender mechanism 83 to the enveloping machine 105 of FIG. 12, and placed on the first feeder 112. The bar code reader 104 in the enveloping machine 105 reads the producing history bar code 7 of the protective cover 6. Information read in the producing history bar code 7 is written to the sequencer 41.

In the film supply feeder 118 of the pillow packaging mechanism 115, the producing history bar code 12 is printed by the second ink jet printer 106 to the packaging film 117. The producing history bar code 12 consists of a combination of the producing history data and instruction data read from the protective cover 6, and also auxiliary producing history data created in the bag inserting process. An example of the auxiliary history data is a flag of a normal state without an error in operation upstream from the second ink jet printer 106. Consequently, there will not occur deviations in the data, because the producing history data and the instruction data previously assigned are used in succeeding processes without data tracking.

While the first feeder 112 feeds the cover-fitted sheet stack 9, the pillow packaging mechanism 115 shapes the packaging film 117 into a tubular form, into which the cover-fitted sheet stack 9 is inserted. The heating roller 120 forms folds to the packaging film 117, at the same time as the cross sealer 119 welds up the packaging film 117 with heat in positions before and after the cover-fitted sheet stack 9. Also, the cutter 121 cuts the packaging film 117, to form the packaging bag 10.

In the fillet folding mechanism 116, the fillet folding robots 123 and 124 grasp the fillets 10*a* and 10*b* of the packaging bag 10, and fold those to the outside of the packaging bag 10. The sticker 11 is attached to each of the fillets 10*a* and 10*b*, which are fixedly retained.

If the elimination instruction is included in the instruction data of the producing history bar code 7 which the bar code reader 104 has read from the protective cover 6, then the sequencer 41 actuates the ejector 107 to eject the packaging bag 10 from the inside of the line together with the photosensitive sheets 2.

The producing result data obtained in the bag inserting process is sent from the sequencer 41 to the production control computer 45 and then to the production managing computer 47, and used for creating the producing history managing data.

In FIG. 13, the packaging bag 10 is transferred to the feeder 136 in the packing machine 131. In the packing machine 131, the bar code reader 130 reads the producing history bar code 12 from the packaging bag 10. Information of the producing history bar code 12 is written to the sequencer 42.

The packaging bag 10 from which the producing history bar code 12 is read is caused to make a one fourth rotation by the direction changer 137, and then becomes fed in its longitudinal direction. The case inserting robot 138 inserts the packaging bag 10 into the packaging case 14. The sealing robot 139 closes the packaging case 14 and attaches the sticker 15 to the packaging case 14.

The third ink jet printer 132 prints the producing history bar code 17 to a surface of the packaging case 14. The producing history bar code 17 consists of a combination of the producing history data and instruction data read from the packaging bag 10 by the bar code reader 130, and also auxiliary producing history data created in the case inserting process. An example of the auxiliary history data is a flag of a normal state without an error in operation upstream from the third ink jet printer 132. The producing result data obtained in the case inserting process is sent to the production managing computer, and used for creating the producing history managing data.

In FIG. 14, the packaging case 14 is transferred to the first feeder 149 of the shipment packing machine 144. The bar code reader 143 reads the producing history bar code 17 from the packaging case 14. Information from the producing history bar code 17 is written to the sequencer 43.

The packaging case 14 after reading the producing history bar code 17 is handled by the transfer robot 151, and removed from the first feeder 149. The transfer robot 151 inserts the packaging case 14 into the packaging container 19 fed by the second feeder 150. Note that four cases 14 are inserted in the packaging container 19. The packaging container 19 after the insertion is closed by the sealing robot 152.

Then the fourth ink jet printer 145 prints the producing history bar code 20 to the upper surface of the packaging container 19. The producing history bar code 20 is determined in the same form as a bar code printed on a particular one of the packaging cases 14 being packaged, for example, one of the packaging cases 14 having the smallest additional number. The producing result data obtained in the container inserting process is input to the production managing computer, and used for creating the producing history managing data.

In FIG. 15, the packaging container 19 containing the packaging case 14 is transferred to the feeder 161 in the palletizing device 158. While the feeder 161 feeds the packaging container 19 intermittently, the bar code reader 157 reads the producing history bar code 20 from the packaging container 19. The producing history data and the instructing data from the producing history bar code 20 is written to the sequencer 44.

The sequencer 44 controls the transfer robot 164 according to the producing history data and instruction data being read, and places the packaging container 19 from the feeder 161 to a suitable one of the pallets 162 and 163. The pallets 162 and 163 are then moved for shipment after the placement of the packaging containers 19 in a predetermined number.

After the photosensitive sheets 2 are shipped in a formed packaged in the packaging container 19, it happens for example that failure is detected in part of the photosensitive sheets 2 which are remaining products shipped at the same time as those packaged in the packaging container 19. In such a case, it is possible to check easily whether the photosensitive sheets 2 packaged in the packaging container 19 are acceptable or failing only by evaluating the producing history bar code 20 of the packaging container 19 with reference to the producing history managing table data or managing chart.

After the photosensitive sheets 2 are removed from the packaging bag 10 by a user and for example, set in an image outputting device, it happens for example that failure is detected in part of the photosensitive sheets 2 which are remaining products shipped at the same time as those removed from the packaging bag 10. In such a case, it is possible to check easily whether the photosensitive sheets 2 at the user are acceptable or failing only by evaluating the producing history bar code 7 of the protective cover 6 with reference to the producing history managing table data.

EXAMPLE

In the above embodiment, the producing history bar code 7 is printed to the protective cover 6 by the ink jet printer. There is no prior technique of printing to the protective cover 6 by use of an ink jet printer. In view of practical use of the package, it is necessary to ensure high reliability in the clarity in the printed image, speed of drying the ink, strength of adhesion of the ink, or the like. Plural types of protective covers of different materials are used for types of medical photographic films. However, the producing/packaging line is single and common between the plural cover types. It is necessary to impart suitability for printing even with any one of the plural materials of the covers.

To solve the above problems, protective covers of Samples Nos. 1–4 were experimentally made from different materials. Ink of Samples Nos. 1–4 was experimentally made in different manners. The clarity in the printed image, speed of drying the ink, strength of adhesion of the ink were tested. The clarity in the printed image was evaluated by observation of eyes of plural inspectors. The speed of drying the ink was tested by rubbing bar codes with fingers of inspectors immediately after the printing. The strength of adhesion of the ink were measured by attaching an adhesive tape to a bar code printed and dried, peeling the adhesive tape, and considering an amount of the peeling. Tables 1 and 2 show specifics of Samples Nos. 1–4 of the protective covers and Samples Nos. 1–4 of the ink.

TABLE 1

| Materials For Protective Covers | |
|---|---|
| Sample No. 1 | Pulp, type L, 70 % (hardwood or broadleaf trees)<br>Pulp, type N, 30 % (softwood or needle leaf trees) |
| Sample No. 2 | Polypropylene sheet |
| Sample No. 3 | Base board: carton board for beverage carton<br>Outer surface treatment: overprinted varnish<br>Inner surface treatment: overprinted varnish |
| Sample No. 4 | Base board: carton board for beverage carton<br>Outer surface treatment: high-density polyethylene (HDPE)<br>Inner surface treatment: low-density polyethylene (LDPE) |

TABLE 2

| Materials For Ink | |
|---|---|
| Sample No. 1 | Methyl ethyl ketone, ethyl acetate, ethyl alcohol, phenol resin, butyral resin, and dye |
| Sample No. 2 | Polyethylene glycol, methyl ether (40–50 %), diacetone alcohol (40–50%), and solvent black 29 (5–10%) |

TABLE 2-continued

| Materials For Ink | |
|---|---|
| Sample No. 3 | Triethylene glycol (40–60%), butoxy triglycol (20–30%), triethylene glycol methyl ether (10–20%), direct black 184 (10% or less), and solvent black 29 (5% or less) |
| Sample No. 4 | Rosin resin (50%), wax (20%), plasticizer (20%), and dye (10%) |

As a result of the tests, it was found that the ink of Sample No. 1 among Nos. 1–4 was very good for any one of the Samples Nos. 1–4 of the protective covers, and in consideration of clarity, speed of drying, strength of adhesion.

In the above embodiment, the producing history data and instruction data are represented by the bar codes. However, information may be expressed by letters, numbers, indicia, or the like. Also, a code of the two dimensions may be used. For use with the letters, the two-dimension code and the like, a CCD camera or other image sensor device may be used in place of the bar code reader.

In the above embodiment, the bar codes are printed by the ink jet printers. However, a thermal printer may be used. For use with this, a region with a thermosensitive coloring layer can be included in a surface of materials for the sheet package. Also, the producing history data may be printed by other methods, for example, laser printing. Furthermore, the producing history data may be given by modes other than printing. For example, the producing history data may be imprinted photographically by exposure, may be formed as notches, grooves, cuts or any negative shapes, may be imparted by attaching a bar code sticker, or the like.

Furthermore, the producing history data may include an emulsion number, a date of manufacture, a producing line number.

In the above embodiment, the producing history data to be printed to the packaging container 19 is determined the same as a selected one of the packaging case 14 contained in the packaging container 19. However, the producing history data to be printed to the packaging container 19 can be determined to include the data of all of the packaging case 14 contained in the packaging container 19. In the above embodiment, the photosensitive sheets 2 being packaged are medical photosensitive films. However, the managing method and system of the present invention may be used for packaging of other types of sheet-shaped articles.

In the above embodiment, the producing history bar code 12 is determined by adding auxiliary history data to the data of the producing history bar code 7. The producing history bar code 17 is determined by adding auxiliary history data to the data of the producing history bar code 12. Also, the producing history bar code 20 is determined equal to the data of a particular one of the sets of the producing history bar code 17 assigned to the four packaging cases 14 contained in the packaging container 19.

However, the data of the producing history bar code 12 and/or 17 may be the same as the data of the producing history bar code 7 without adding auxiliary information. Furthermore, the producing history bar code 20 may be determined by adding auxiliary history data to the data of one of the sets of the producing history bar code 17 assigned to a particular packaging case 14.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A producing history managing method for a photosensitive sheet package obtained after a producing process and a packaging process, said photosensitive sheet package including plural photosensitive sheets produced in said producing process, a protective cover for sandwiching said photosensitive sheets stacked on one another, to obtain a cover-fitted sheet stack, a packaging bag for containing said cover-fitted sheet stack, and a packaging case for containing said packaging bag with said cover-fitted sheet stack contained therein, said producing history managing method comprising steps of:

printing producing history data to said protective cover, said producing history data being obtained according to said producing and packaging processes;

printing said producing history data to said packaging bag; and printing said producing history data to said packaging case.

2. A producing history managing method as defined in claim 1, further comprising steps of:

containing plural packaging cases into an outer packaging container, each of said plural packaging cases having said packaging bag contained therein;

printing said producing history data to said packaging container.

3. A producing history managing method as defined in claim 2, further comprising steps of:

reading said producing history data from said protective cover, said producing history data being adapted to printing to said packaging bag;

reading said producing history data from said packaging bag, said producing history data being adapted to printing to said packaging case;

reading said producing history data from said packaging case, said producing history data being adapted to printing to said packaging container.

4. A producing history managing method as defined in claim 3, wherein said plural photosensitive sheets are obtained by cutting a continuous sheet, and said producing history data includes data for representing a cut position of said photosensitive sheets in said continuous sheet.

5. A producing history managing method as defined in claim 4, further comprising a step of, before sandwiching of said photosensitive sheets in said protective cover, recording said producing history data to a portion of said photosensitive sheets by exposure.

6. A producing history managing method as defined in claim 4, further comprising steps of:

determining first auxiliary data related to containing of said cover-fitted sheet stack into said packaging bag;

determining first renewed history data by adding said first auxiliary data to said producing history data, said first renewed history data being said producing history data printed to said packaging bag;

determining second auxiliary data related to containing of said packaging bag into said packaging case; and determining second renewed history data by adding said second auxiliary data to said first renewed history data, said second renewed history data being said producing history data printed to said packaging case.

7. A producing history managing method as defined in claim 6, wherein said producing history data for printing to said packaging container is selected and determined among plural sets of said second renewed history data printed on said plural packaging cases.

8. A producing history managing method as defined in claim 6, further comprising steps of:

determining third auxiliary data related to containing of said packaging case into said packaging container; and determining third renewed history data by adding said third auxiliary data to said second renewed history data, said third renewed history data being said producing history data printed to said packaging container.

9. A producing history managing method as defined in claim 6, wherein said reading step from said packaging bag includes reading of said first renewed history data, and said reading step from said packaging case includes reading of said second renewed history data.

10. A producing history managing system for a photosensitive sheet package, including a sheet cutter for producing plural photosensitive sheets by cutting a continuous sheet, a covering machine for loading a protective cover with said plural photosensitive sheets stacked on one another in a sandwiched manner, to obtain a cover-fitted sheet stack, an enveloping machine for containing said cover-fitted sheet stack in a packaging bag, and a packing machine for containing said packaging bag into a packaging case with said cover-fitted sheet stack contained therein, said producing history managing system comprising:

a first printer for printing producing history data to said protective cover, said producing history data being related to cutting in said sheet cutter;

a second printer for printing said producing history data to said packaging bag; and a third printer for printing said producing history data to said packaging case.

11. A producing history managing system as defined in claim 10, further comprising:

a shipment packing machine for containing plural packaging cases into an outer packaging container, each of said plural packaging cases having said packaging bag contained therein;

a fourth printer for printing said producing history data to said packaging container.

12. A producing history managing system as defined in claim 11, further comprising:

a first data reader for reading said producing history data from said protective cover, said producing history data being adapted to printing to said packaging bag;

a second data reader for reading said producing history data from said packaging bag, said producing history data being adapted to printing to said packaging case; and a third data reader for reading said producing history data from said packaging case, said producing history data being adapted to printing to said packaging container.

13. A producing history managing system as defined in claim 12, further comprising a production control computer for managing operation of said sheet cutter, said covering machine, said enveloping machine and said packing machine, and for outputting said producing history data.

14. A producing history managing system as defined in claim 13, wherein said production control computer further determines first auxiliary data related to containing of said cover-fitted sheet stack into said packaging bag, and determines second auxiliary data related to containing of said packaging bag into said packaging case;

further comprising:

a first memory for storing first renewed history data by adding said first auxiliary data to said producing history data;

a second memory for storing second renewed history data by adding said second auxiliary data to said first renewed history data;

wherein said second printer prints said first renewed history data to said packaging bag, and said third printer prints said second renewed history data to said packaging case.

15. A producing history managing system as defined in claim 14, wherein said producing history data for printing to said packaging container is selected and determined among plural sets of said second renewed history data printed on said plural packaging cases.

16. A producing history managing system as defined in claim 14, wherein said production control computer further determines third auxiliary data related to containing of said packaging case into said packaging container;

further comprising a third memory for storing third renewed history data determined by adding said third auxiliary data to said second renewed history data;

wherein said fourth printer prints said third renewed history data to said packaging container.

17. A producing history managing system as defined in claim 14, wherein said second data reader reads said first renewed history data, and said third data reader reads said second renewed history data.

18. A producing history managing system as defined in claim 17, further comprising:

a web slitter for producing said continuous sheet by slitting web from a master roll, to wind said continuous sheet to form a slit roll, wherein said sheet cutter is supplied with said continuous sheet by unwinding from said slit roll; and a production managing computer for managing said production control computer and said web slitter.

19. A producing history managing system as defined in claim 18, further comprising a data imprinting device, positioned upstream from said covering machine, for recording said producing history data to said photosensitive sheets by exposure.

20. A producing history managing system as defined in claim 18, wherein a form of said producing history data is a bar code.

21. A producing history managing system as defined in claim 18, wherein said sheet cutter, said covering machine, said enveloping machine, said packing machine and said shipment packing machine respectively output first data representing a production number of said photosensitive sheets or said cover-fitted sheet stack, and a failure product number of failing ones of said photosensitive sheets or said cover-fitted sheet stack;

said production control computer determines second data according to said first data, and said second data is adapted to managing a producing history.

22. A producing history managing system as defined in claim 21, wherein said production managing computer creates producing history managing table data in which plural sets of said producing history data are arranged in a matrix form, and are associated with respectively a particular one of said cover-fitted sheet stack.

23. A producing history managing system as defined in claim 22, wherein said producing history data has:

a slit number data portion associated with said slit roll; and a packaging unit data portion associated with said cover-fitted sheet stack.

24. A producing history managing system as defined in claim 23, wherein said producing history data further includes an instruction data portion adapted to designating a post-treating operation to be effected.

25. A producing history managing system as defined in claim 24, wherein said post-treating operation includes:

producing a sticker in association with said cover-fitted sheet stack for attachment to said packaging bag and said packaging case; or if said photosensitive sheets or said cover-fitted sheet stack is detected failing, eliminating said photosensitive sheets or said cover-fitted sheet stack being failing.

26. A producing history managing system as defined in claim 24, wherein said matrix form includes plural lines and plural columns, each of said plural columns is associated with said slit roll, each of said plural lines is associated with a position of said photosensitive sheets in said continuous sheet.

27. A producing history managing system as defined in claim 24, wherein said producing history managing table data is produced in association with said master roll being single.

28. A producing history managing system as defined in claim 24, wherein said producing history data further includes a producing lot number data portion associated with said master roll.

* * * * *